United States Patent

Hamilton, Jr. et al.

[11] Patent Number: 5,631,703
[45] Date of Patent: May 20, 1997

[54] PARTICULAR PATTERN OF PIXELS FOR A COLOR FILTER ARRAY WHICH IS USED TO DERIVE LUMINANCE AND CHROMINANCE VALUES

[75] Inventors: John F. Hamilton, Jr.; James E. Adams, Jr., both of Rochester, N.Y.

[73] Assignee: Eastman Kodak Company, Rochester, N.Y.

[21] Appl. No.: 655,107

[22] Filed: May 29, 1996

[51] Int. Cl.$^6$ ............................................. H04N 9/07
[52] U.S. Cl. ............................. 348/273; 348/279
[58] Field of Search ........................... 348/266, 272, 348/273, 279; 358/43, 44; H04N 9/07

[56] References Cited

U.S. PATENT DOCUMENTS

| | | | |
|---|---|---|---|
| 3,971,065 | 7/1976 | Bayer | 358/41 |
| 4,148,059 | 4/1979 | Dillon et al. | 358/37 |
| 4,176,373 | 11/1979 | Dillon et al. | 358/37 |
| 4,668,975 | 5/1987 | Kuwayama et al. | 358/44 |
| 4,670,777 | 6/1987 | Ishikawa et al. | 358/48 |
| 5,249,041 | 9/1993 | Shiraishi | 358/44 |
| 5,419,990 | 5/1995 | Wake et al. | 430/7 |
| 5,506,619 | 4/1996 | Adams, Jr. et al. | 348/272 |

FOREIGN PATENT DOCUMENTS

| | | | |
|---|---|---|---|
| 0233768 | 2/1987 | European Pat. Off. | H01L 31/02 |
| 0485221A2 | 11/1991 | European Pat. Off. | H04N 9/04 |
| 62277881 | 12/1987 | Japan. | |
| 3107903 | 5/1991 | Japan. | |

*Primary Examiner*—Sherrie Hsia
*Attorney, Agent, or Firm*—Raymond L. Owens

[57] ABSTRACT

A color filter array for an image sensor which has a plurality of pixels is disclosed. The color filter array includes a plurality of color pixel kernels, with each kernel having a plurality of pixels arranged in the following pattern

| M | G | C | Y |
|---|---|---|---|
| G | M | Y | C |
| Y | C | G | M |
| C | Y | M | G | wherein:

M is magenta;
G is green;
C is cyan; and
Y is yellow.

3 Claims, 1 Drawing Sheet

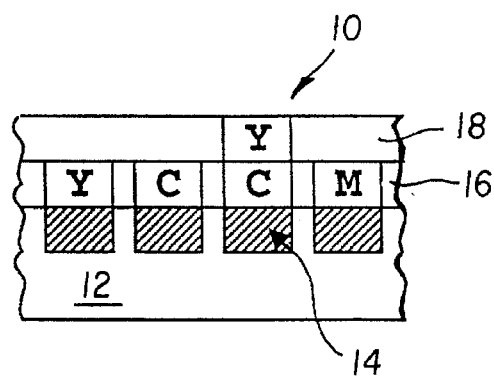

PARTICULAR PATTERN OF PIXELS FOR A COLOR FILTER ARRAY WHICH IS USED TO DERIVE LUMINANCE AND CHROMINANCE VALUES

CROSS REFERENCE TO RELATED APPLICATION

The present invention is related to commonly assigned U.S. Ser. No. 08/407,423 filed Mar. 17, 1995 entitled "Adaptive Color Plan Interpolation in Single Sensor Color Electronic Camera" to Hamilton et al, assigned to the assignee of the present invention. The disclosure of this related application is incorporated herein by reference.

FIELD OF THE INVENTION

The present invention relates to color filter arrays for image sensors.

BACKGROUND OF THE INVENTION

In electronic color imaging, it is desirable to simultaneously capture image data in three color planes, usually red, green and blue. When the three color planes are combined, it is possible to create high-quality color images. Capturing these three sets of image data can be done in a number of ways. In electronic photography, this is sometimes accomplished by using a single two dimensional array of sensors that are covered by a pattern of red, green and blue filters. This type of sensor is known as a color filter array or CFA. Below is shown the red (R), green (G) and blue (B) pixels as are commonly arranged on a CFA sensor.

When a color image is captured using a CFA, it is necessary to interpolate the red, green and blue values so that there is an estimate of all three color values for each sensor location. Once the interpolation is done, each picture element, or pixel, has three color values and can be processed by a variety of known image processing techniques depending on the needs of the system. Some examples of the reasons for processing are to do image sharpening, color correction or half toning.

The diagram below shows how red green and blue pixels can be arranged in a particular color filter array pattern, hereinafter referred to as the Bayer color filter array. For a more detailed description see U.S. Pat. No. 3,971,065 issued Jul. 20, 1976 to Bayer.

| G | R | G | R |
|---|---|---|---|
| B | G | B | G |
| G | R | G | R |
| B | G | B | G |

In commonly assigned U.S. Ser. No. 08/606,112 filed Feb. 23, 1996 entitled "Adaptive Color Plane Interpolation in Single Sensor Color Electronic Camera" to Adams et al and commonly assigned U.S. Ser. No. 08/606,178 filed Feb. 23, 1996 entitled "Averaging Green Values for Green Photosistes in Electronic Cameras" to Hamilton et al adaptive methods of calculating green pixel values at pixels where green is not directly measured is described, the teachings of which are incorporated herein by reference. These methods produce better reconstructions for horizontal and vertical features than they are for diagonal features in the image. This is because there are green pixels in every row and every column of the CFA. However, every other diagonal in the CFA is devoid of green pixels. With this arrangement, the frequency response on diagonals is less than that on horizontal rows and vertical columns. As a consequence, diagonal edges are less sharp than horizontal and vertical edges. Moreover, interpolation of green values in the diagonal direction is not available. It would be desirable to have a CFA pattern in which diagonal interpolation, in addition to horizontal and vertical interpolation, would be available.

SUMMARY OF THE INVENTION

It is an object of the present invention is to provide a color filter array pattern which provides signals which can be efficiently processed.

It is a further object of the invention to have a CFA pattern in which diagonal interpolation, in addition to horizontal and vertical interpolation, is available.

This object is achieved in a color filter array for an image sensor which has a plurality of pixels, a color filter array comprising:

(a) a plurality of color pixel kernels, with each kernel having a plurality of pixels arranged in the following pattern

| X1 | Y1 |
|----|----|
| Y2 | X2 |

(i) wherein X1 and X2 respectively represent luminance values wherein the sum of their individual colors are luminance and the difference of their individual colors are chrominance; and (ii) wherein Y1 and Y2 respectively represent luminance values wherein the sum of their individual colors are luminance and the difference of their individual colors are chrominance.

ADVANTAGES

This invention permits non-linear interpolation of luminance values in not only horizontal and vertical but also in diagonal directions, regardless of location within the CFA pattern.

Another advantage of the present invention is that the same processing can be used irrespective of the location of the pixels in the CFA.

Another advantage of the present invention is that it facilitates the use of the smallest kernel of CFA pixels can be used to provide a high quality estimate of luminence.

BRIEF DESCRIPTION OF THE DRAWINGS

FIG. 1 is a plan view of a generalized kernel of a color filter array in accordance with the present invention;

FIG. 2 is a plan view of a particular embodiment of a kernel of a color filter array in accordance with the present invention;

FIG. 3 is a cross-sectional view taken along the lines 3—3 of an area image sensor FIG. 2 and shown in schematic form including the arrangement of dye-receiving layers;

FIG. 4 is a plan view of the embodiment shown in FIG. 2 with subscript numbers added to show rows and columns; and FIG. 5 is a plan view of another embodiment of a kernel of a color filter array in accordance with the present invention.

DESCRIPTION OF THE PREFERRED EMBODIMENTS

FIG. 1 is a plan view of a new four-color CFA kernel. The colors are chosen so that V=(A+B)/2=(C+D)/2, where V is luminance. By use of the term "kernel" is meant a minimal repeating pattern of color pixels of a CFA filter that is two-dimensionally replicated over the full extent of the color filter array. In a preferred embodiment set of colors is A=magenta (M), B=green (G), C=cyan (C) and D=yellow (Y). Expressing this set of colors in terms of red (R), green (G) and blue (B):

$$M=(R+B)/2$$

$$G=G$$

$$C=(G+B)/2$$

$$Y=(R+G)/2$$

Under these definitions, V=(R+2G+B)/4. This preferred embodiment is shown in FIG. 2 wherein the pattern has green, magenta, and yellow pixels.

FIG. 3 is a cross-sectional view of an area image sensor 10 taken along the lines 3—3 of FIG. 2. As shown, the image sensor 10 includes a silicon substrate 12 into which is doped pixel areas 14. In this particular embodiment, there are two dye-receiving layers 16 and 18 respectively formed on the silicon substrate 12. In this arrangement, the dye pattern shown in FIG. 2 is exemplified. It should be noted that a yellow portion is disposed directly over a cyan dye portion. These portions are aligned with a particular image sensor pixel. The combination of the yellow and cyan portions forms the green pixels shown in FIG. 2. Although the superimposed cyan and yellow colored portions are preferably the same cyan and yellow dyes shown in the dye-receiving layers 16, it will be understood by those skilled in the art that different cyan and yellow dyes can be used to form a green pixel. For an example of a color filter array which uses different color dyes, see commonly assigned U.S. Pat. No. 5,419,990 issued May 30, 1995 entitled "Color Filter Arrays with Optimum Dye Density" to Wake et al, the disclosure of which is incorporated herein.

Due to the arrangement of color filter array pattern shown in FIG. 2, V can be interpolated in four distinct directions at each location in the CFA. This produces a rich set of predictors that can be used by adaptive CFA interpolation routines. In FIG. 4, the same color pixel kernel shown as in FIG. 2; however, in FIG. 4 each of the pixels carry a subscript number. The first number in the subscript corresponds to the row and the second subscript corresponds to the column. For clarity of illustration, FIG. 4 has been shows as a 5×5, although the kernel, of course, is still 4×4. Most notably, at each location in the pattern, V can be estimated in the horizontal, vertical, positive slope diagonal and negative slope diagonal directions. The value $V_{33}$ can be calculated as below:

$$V_{33} = (Y_{31} + 2C_{32} + 2G_{33} + 2M_{34} + Y_{35})/8 \quad \text{(Eqs. 1)}$$
$$V_{33} = (C_{13} + 2Y_{23} + 2G_{33} + 2M_{43} + C_{53})/8$$
$$V_{33} = (M_{15} + 2C_{24} + 2G_{33} + 2Y_{42} + M_{51})/8$$
$$V_{33} = (M_{11} + 2M_{22} + 2G_{33} + 2G_{44} + M_{55})/8$$

Two chrominance channels are also defined for this pattern: $C_1=K_1(D-C)$ and $C_2=K_2(A-B)$. The values $K_1$ and $K_2$ are scaling constants. In the preferred embodiment of FIG. 2, $K_1=1$, $K_2=\frac{1}{2}$ and, as before, A=M, B=G, C=C and D=Y. As a result, once a luminance value has been calculated for each pixel location, $C_1$ or $C_2$ can be calculated directly. Missing values of $C_1$ and $C_2$ can be interpolated in standard ways well understood by those in the art, for example, using the average of two neighboring pixels.

Once there is a value of V, $C_1$ and $C_2$ at each pixel location, corresponding values of R, G and B can be obtained through a simple linear transform.

In accordance with the above discussion, A and B are defined to be companion colors in that the sum of the colors is proportional to luminance and the difference of the colors is proportional to chrominance. Likewise, C and D are also companion colors.

FIG. 5 shows an alternative embodiment of the present invention. It should be noted that the kernel pattern of FIG. 5 is similar to that shown in FIG. 2 with the exception that the cyan pixels are replaced by yellow pixels and the yellow pixels are replaced by cyan pixels. It should now be clear that these colors can be handled in a similar fashion using Equations 1.

The invention has been described in detail with particular reference to certain preferred embodiments thereof, but it will be understood that variations and modifications can be effected within the spirit and scope of the invention.

PARTS LIST 10 image sensor
12 silicon substrate
14 pixel areas
16 dye-receiving layers
18 dye-receiving layers

We claim:

1. A color filter array for an image sensor which has a plurality of pixels, the color filter array comprising:

(a) a plurality of color pixel kernels, with each kernel having the plurality of pixels arranged in the following pattern

| A | B | C | D |
|---|---|---|---|
| B | A | D | C |
| D | C | B | A |
| C | D | A | B | wherein:

A and B are companion colors; and

C and D are companion colors.

2. A color filter array for an image sensor which has a plurality of pixels, the color filter array comprising:

(a) a plurality of color pixel kernels, with each kernel having the plurality of pixels arranged in the following pattern

| | | | |
|---|---|---|---|
| M | G | C | Y |
| G | M | Y | C |
| Y | C | G | M |
| C | Y | M | G | wherein:

M is magenta;

G is green;

C is cyan; and

Y is yellow.

3. A color filter array for an image sensor which has a plurality of pixels, the color filter array comprising:

(a) a plurality of color pixel kernels, with each kernel having the plurality of pixels arranged in the following pattern

| | | | |
|---|---|---|---|
| M | G | Y | C |
| G | M | C | Y |
| C | Y | G | M |
| Y | C | M | G | wherein:

M is magenta;

G is green;

C is cyan; and

Y is yellow.

* * * * *